No. 762,010. PATENTED JUNE 7, 1904.
F. B. UNCAPHER.
GAGE.
APPLICATION FILED AUG. 24, 1903.
NO MODEL.
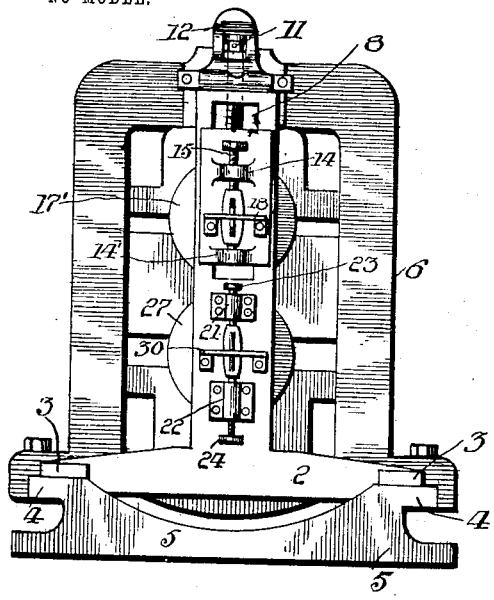
Fig. 1.
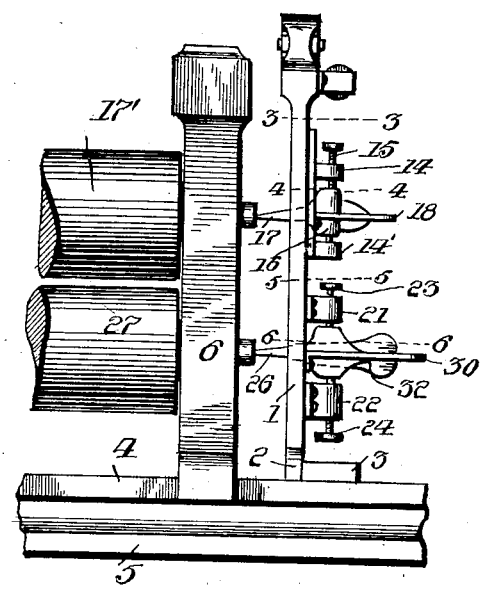
Fig. 2.
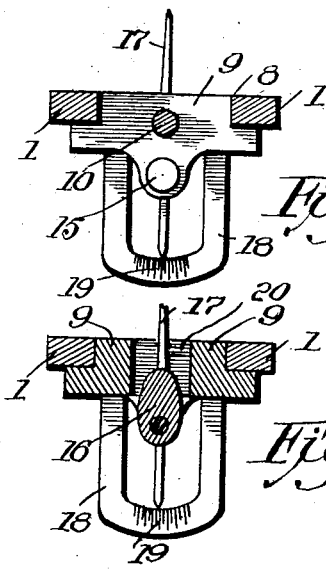
Fig. 3.
Fig. 4.
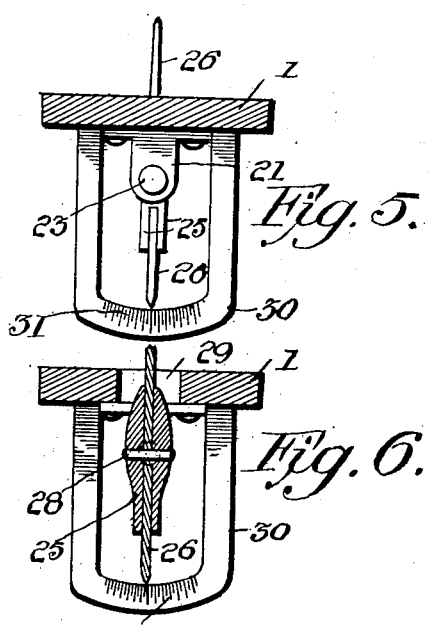
Fig. 5.
Fig. 6.
Fig. 7.
Witnesses
F. H. Butler.
E. E. Potter.
Inventor
F. B. Uncapher.
By N. C. Forth,
Attorneys.
THE NORRIS PETERS CO., PHOTO-LITHO., WASHINGTON, D. C.

No. 762,010. Patented June 7, 1904.

UNITED STATES PATENT OFFICE.

FRANCIS B. UNCAPHER, OF SALTSBURG, PENNSYLVANIA.

GAGE.

SPECIFICATION forming part of Letters Patent No. 762,010, dated June 7, 1904.

Application filed August 24, 1903. Serial No. 170,528. (No model.)

*To all whom it may concern:*

Be it known that I, FRANCIS B. UNCAPHER, a citizen of the United States of America, residing at Saltsburg, in the county of Indiana and State of Pennsylvania, have invented certain new and useful Improvements in Gages, of which the following is a specification, reference being had therein to the accompanying drawings.

This invention relates to certain new and useful improvements in gages, and relates specifically to a gage adapted to be used in connection with rolls for the purpose of determining when the rolls are in perfect alinement and also for leveling the rolls when desired.

Briefly described, my invention embodies a gage which includes indicating means for each roll and also carries leveling means for determining when the rolls are level.

In describing the invention in detail reference is had to the accompanying drawings, forming a part of this specification, and wherein like numerals of reference indicate like parts throughout the several views, in which—

Figure 1 is an end elevation of a set of rolls, showing my improved gage in position. Fig. 2 is a side elevation showing the rolls broken away. Fig. 3 is a horizontal sectional view taken on the line 3 3 of Fig. 2. Fig. 4 is a like view taken on the line 4 4 of Fig. 2. Fig. 5 is a like view taken on the line 5 5 of Fig. 2. Fig. 6 is a view taken on the line 6 6 of Fig. 2. Fig. 7 is a detail sectional view of the bearing for the indicator or gage for the lower roll.

To put my invention into practice, I provide an upright or support 1, which is attached to the base 2, and this base 2 is provided with laterally-extending supports or feet 3, adapted to rest on the guideways 4 of the base 5, which guideways of said base receive the housings 6. To the outer face of the upright or at any other point which it may be convenient to attach the same I secure the spirit or other desirable form of level 7, by means of which the device may be used for the leveling of the rolls. The upright or support 1 is provided near its upper end with a slot or way 8, in which is fitted to slide or be moved up and down the plate 9, carrying at its upper end a screw-threaded rod or stem 10, having an adjusting-nut 11 thereon, which nut works in the opening provided therefor in the frame 12, carried on the upper end of the upright or support 1. The plate 9 is provided at its outer face with lugs or extensions 14 14', in the former of which is mounted the screw 15, which has bearing in the oscillatory body portion 16 of the indicator or pointer 17 for the upper roll 17', and in the bearing 14' is fitted a similar journal-pin to work freely in the lower end of the body portion 16 of the indicator or gage. The body portion 16 has an open frame 18, surrounding the same, which is provided with a scale 19, said body projecting into an opening 20, provided therefor in the plate 9 and through which the inner end of the indicator or pointer extends.

Attached to the outer face of the upright or support 1, below the indicator just described, are brackets or bearings 21 22, in which is threaded adjusting-screws 23 24, respectively, the ends of which are pointed, as seen in Fig. 7, to form a bearing with the body 25, which carries the indicator 26 for the lower roll 27. The indicator 26 is pivoted in the body 25, as seen at 28 in Fig. 6, and consequently an oscillatory movement in both vertical and horizontal planes, the opening 29 in the upright or support 1 being of sufficient size to permit both these movements. This indicator is also surrounded by a frame 30, having a scale 31 thereon. The frame 18 is preferably riveted to the plate 9, while the frame 30 is riveted to the upright 1.

The inner ends of the indicators 17 and 26 are pointed, and these ends are engaged in the necks of the rolls 17' 27, respectively. The indicator 26 is flattened at its outer end and provided with a scale 32 on its side face. This scale determines the vertical movement of the roll, while the scale 31 will determine the lateral movement of the same. The engagement of the indicators 17 26 in the necks of the rolls will cause these indicators or gages to be moved in unison with the rolls in case of any vertical or lateral shifting of said rolls and indicating whether the rolls are out of alinement. The indicator for the lower roll has both vertical and horizontal oscillatory movements, and the indicator for the upper roll may also be so constructed, though in general practice the horizontal movement only need be provided for in this indicator, as the adjusting means for the upper roll holds the latter against vertical displacement. When the upper roll is adjusted vertically by the ordinary means always provided in the housings, the slide-plate 9 may be adjusted by means of the threaded rods 10 and nut 11, whereby to bring the indicator 17 into position to again center with the neck of the said upper roll.

It will be noted that various changes may be made in the details of construction without departing from the general spirit of my invention.

The upright is secured in its position adjacent the roll-necks in such position as to permit the indicators or pointers 17 and 26 to engage in the center of said roll-necks, the body portion of the indicator 17 having been adjusted so as to permit the said pointer to lie in a horizontal plane, a like operation being performed upon the pointer-support 25. Any lateral movement of the rolls after adjustment will naturally create a like movement upon the pointers or indicators, and any vertical movement of the roll will be known by reason of the pointer 26 indicating the same upon the scale 32 on its side face.

Having fully described my invention, what I claim as new, and desire to secure by Letters Patent, is—

1. In a roll-gage, an upright, an oscillatory body carried thereby, a graduated frame surrounding the same, and an indicator mounted in said body and having a movement independent thereof, said indicator having one of its ends projecting through said support, and its other end graduated and coacting with said frame.

2. A gage comprising a support, an adjustable plate mounted therein, an indicator pivoted therein and projecting through the support, and a second indicator carried by said support and being adapted to oscillate at right angles to the first-named indicator.

3. In a roll-gage, an upright carrying an oscillatory body with a graduated frame surrounding the same, and an indicator pivotally mounted in the body, and having one of its ends adjacent said graduated frame.

4. A roll-gage comprising a support with indicators pivoted therein, one of said indicators oscillating at right angles to the other and having its outer end graduated, and a graduated frame surrounding the outer end of the last-named indicator.

In testimony whereof I affix my signature in the presence of two witnesses.

FRANCIS B. UNCAPHER.

Witnesses:
W. R. KLINE,
JNO W. SHADLE.